July 25, 1967 W. R. BAKER 3,333,203
PULSE GENERATOR WITH STANDING WAVE ENERGY STORAGE
Filed Oct. 6, 1964
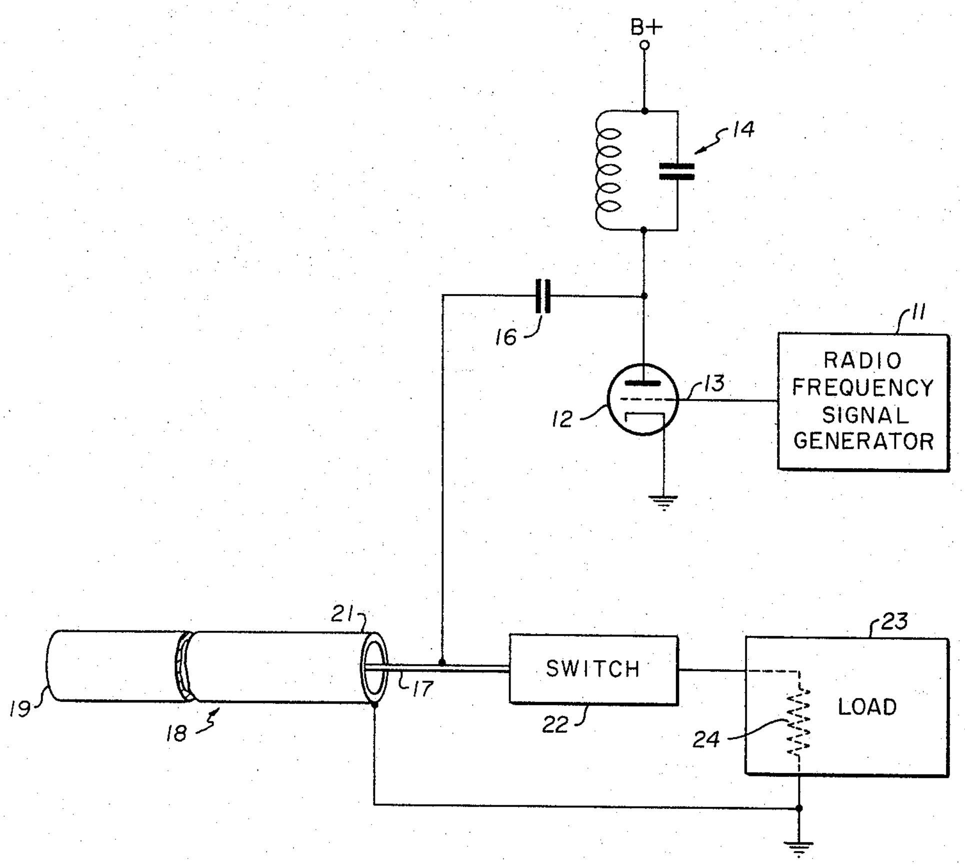
INVENTOR.
WILLIAM R. BAKER
BY
Roland A. Anderson
ATTORNEY.

United States Patent Office 3,333,203
Patented July 25, 1967

3,333,203
PULSE GENERATOR WITH STANDING WAVE ENERGY STORAGE

William R. Baker, Orinda, Calif., assignor to the United States of America as represented by the United States Atomic Energy Commission Filed Oct. 6, 1964, Ser. No. 402,042
9 Claims. (Cl. 328—59)

ABSTRACT OF THE DISCLOSURE

This invention is an electronic circuit for producing a high power output signal comprising a predetermined number of signal cycles over a precisely defined pulse time period. In the circuit, standing waves are generated in a high "Q" pulse line from a low power signal generator. The energy stored in the standing waves is discharged by suddenly connecting the line to a matching load.

The present invention relates generally to an electronic pulse generating circuit and more particularly to a circuit for producing very high energy pulses. The invention described herein was made in the course of, or under Contract W–7405–eng–48 with the Atomic Energy Commission.

This invention was originated to provide pulses of electrical energy wherein each pulse consists of a preset number of cycles of an output signal at a selected frequency. The pulses have essentially no rise or decay time and the frequency of the signal making up the pulse is accurately fixed. To give an example of the characteristics of a typical output pulse obtainable with the invention, a one hundred million watt output pulse lasting for two microseconds may be obtained, each pulse containing exactly sixty cycles of a sinusoidal output signal at a thirty megacycle per second rate.

The invention utilizes a section of transmission line having a high figure of merit or high Q, that is, very low losses. A high frequency power source is operated at the frequency of the signal making up the desired output pulses. The power source is coupled to the transmission line which must have a length exactly equal to a multiple of a quarter wavelength of the input signal frequency, whereby standing waves can build up along the line. Power from the source is stored in the electric and magnetic fields in the standing waves along the line. After a large quantity of energy is stored in the standing waves, an output pulse is created by closing a switch to connect the transmission line to a load where the energy is to be utilized. The energy in the standing waves discharges into the load during a time period equal to the time required for an electromagnetic wave to traverse the line from the switch to the opposite end of the line and return. The pulse is self-terminating if the impedance of the load is resistive and is made equal to the characteristic impedance of the line.

It is an object of the present invention to provide a high power pulse generator producing pulses of precisely controlled characteristics.

It is another object of the present invention to provide a very high power pulse generator.

It is another object of the present invention to provide a pulse generator which produces electrical pulses having essentially no rise or decay time.

It is another object of the present invention to provide a high energy pulse source operating from a low energy supply.

It is another object of the present invention to provide an electrical pulse comprised of several cycles of sine wave energy in which the number of cycles within the pulse and the frequency of the sine wave may be precisely controlled.

The invention will be better understood by reference to the following specification and the accompanying drawing which is a circuit diagram of a representative embodiment thereof.

Referring now to the drawing, a first component of the invention is a radio frequency signal generator 11. A power output tube 12 for amplifying the output of the signal generator 11 receives radio frequency output signals therefrom at a control electrode 13. A parallel tuned circuit 14 in the anode circuit of the output tube 12 is tuned to the frequency of the signal source 11 and output signals developed across the high impedance of the circuit are taken through a coupling capacitor 16 to the central conductor 17 of a coaxial line 18.

The relationship between the operating frequency of the signal source 11 and the length of the coaxial line 18 is critical for proper operation of the circuit. The electrical length of the coaxial line 18 should be an exact multiple of a quarter-wavelength of the source 11 operating frequency in order to build up standing waves. The termination for line 18 at a first end 19 has an impedance as far removed from the characteristic impedance of the line as possible, the termination being either an open circuit or a short. If the end 19 of the transmission line 18 is open, that is, there is no conducting connection between the central conductor 17 and the outer shield conductor 21, then an even number of standing quarter waves are created in the line. If the end 19 is shorted, an odd number of quarter standing waves will be present.

When an output pulse is desired, a switch 22 is closed, connecting the central conductor 17 to a utilization device or load 23. To obtain self termination of output pulses with minimum decay time, the load impedance should match the characteristic impedance of the transmission line 18. Such load 23 impedance is indicated by an equivalent resistance 24 connected from the output of the switch to the grounded outer shield 21.

It is desirable to couple as much power as possible from the output tube 12 to the transmission line 18. The exact point along the central conductor 17 at which the coupling capacitor 16 is connected to obtain maximum power transfer will depend upon the individual characteristics of the tube 12 and the line 18. Generally, however, the capacitor 16 will be connected at a maximum voltage position along the transmission line 18 such as will exist at the end of the central conductor 17 adjacent the switch 22. Such maximum voltage points will also exist at multiples of half-wavelength distances along the line from the switch 22. A step-up voltage transformation may be obtained by connecting the coupling capacitor 16 at some point along the central conductor 17 other than at the maximum voltage positions.

In operation, the radio frequency generator 11 and the output tube 12 are generally operated continuously. The output energy applied to the transmission line creates standing waves therein which build up the releasable stored radio-frequency power to a maximum value equal to the power of the input signal times the Q of the line divided by the number of quarter wavelengths in the line. That is:

$$\text{Max. power stored} = \frac{\text{Power of input signal} \times Q}{\text{Number of 1/4 wavelengths in line}}$$

Obviously, it is advantageous to provide a line having maximum Q value so that the ratio of output pulse power to input power may be as high as possible. For a transmission line of large diameter the Q can be quite high. For instance, a copper coaxial line with a diameter of three feet can have a Q of 20,000. If there is limited space available for the line, or if a higher Q value is desirable to increase the input to output power ratio, a superconductive line may be utilized.

When the switch 22 is closed, an electromagnetic wave traverses the transmission line from the switch 22 to the end 19 and is reflected back to the switch. If the load impedance 24 matches the line impedance, the electromagnetic wave only traverses the transmission line twice, the output pulse to the load ending abruptly when the wave arrives back at the switch, since all the standing wave energy in the line has been transferred to the load 23. Therefore, the duration of the output pulse is determined by the length of the transmission line 18. For instance, if an output pulse two microseconds in duration is desired, the length of the transmission line 18 should be approximately 900 feet, this being the distance that an electromagnetic wave will traverse in one microsecond in most transmission lines. Since an output pulse is provided during the time it takes an electromagnetic pulse to travel down the transmission line from one end to the opposite and back again, a two microsecond pulse is provided. Therefore, the line length in feet is approximately equal to 450 times the pulse duration in microseconds.

Referring again to the example of the invention previously discussed, if a one hundred million watt pulse of power lasting for two microseconds is desired, each pulse being comprised of a thirty megacycle wavetrain so that each pulse consists of sixty periods of sine wave output signal, then a line in which there are 120 standing quarter wavelengths is provided. Using the previously noted equation, an input power of 600 kilowatts is required to obtain a one hundred megawatt output pulse with a transmission line having a Q of 20,000.

Numerous variations are possible without departing from the invention, for instance, the transmission line 18 may be some type other than a coaxial line. The details of the signal input circuit may be varied. As shown in the figure, the input circuit is always coupled to the transmission line 18, thus after cessation of an output pulse the input signal source 11 is coupled through to the load 23 and will provide a relatively low amplitude signal thereto. Since in this example the amplitude of the input signal applied to the transmission line 18 is $1/167$ of the output pulse amplitude, such condition can generally be ignored. However, if necessary, the signal source 11 can easily be inactivated by gating or de-coupling during the output pulse.

It will be apparent to those skilled in the art that numerous variations and modifications may be made within the spirit and scope of the invention and thus it is not intended to limit the invention except as defined in the following claims.

What is claimed is:

1. In an electrical circuit providing output pulses in which each pulse is made up of a predetermined number of cycles of radio-frequency energy at a preselected frequency, the combination comprising a source of radio-frequency power operative at said frequency, a low loss transmission line means for accumulating radio-frequency energy for periods of time longer than the time for one cycle to travel the length of said means and return coupled to the output of said source and having a characteristic impedance, said line having a length equal to an exact multiple of a quarter wavelength of said radio-frequency power source, said line having termination means with an impedance value substantially differing from said characteristic impedance of said line, said line length in feet being substantially equal to the duration of one of said pulses in microseconds times 450, and an output switch connected to said transmission line.

2. In an electrical circuit producing output pulses for a utilization device, the pulses each containing a predetermined number of alternating current electrical cycles, the combination comprising a source of alternating electrical energy having a frequency equal to that of said cycles, a transmission line means for accumulating radio-frequency energy for periods of time longer than the time for one cycle to travel the length of said means and return having a characteristic impedance and being coupled to the output of said source of energy, said line having a first end and having a second end, said transmission line having a length equal to an exact multiple of a quarter wavelength of said alternating electrical energy, said line length being equal to one-half the distance an electrical signal traverses during the period of one output pulse, a termination means applied to said second end and having an impedance value differing by a high ratio from said characteristic impedance, and an output switch connected to said first end.

3. An electrical circuit as described in claim 2, wherein said termination means is a short circuit across said transmission line at said second end.

4. An electrical circuit as described in claim 2, wherein said termination means is an open circuit across said transmission line at said second end.

5. In an electronic circuit creating high energy output pulses, the combination comprising a source of radio-frequency signals, a transmission line means for accumulating radio-frequency energy for periods of time longer than the time for one cycle to travel the length of said means and return coupled to said source for receiving said signals, said line having a characteristic impedance and having a length equal to a multiple of a quarter wavelength of said radio-frequency signal, a normally open output switch connected to one end of said transmission line, a mismatched terminating means at the other end of said transmission line, and a load connectable through said switch to said transmission line, said load having a characteristic impedance matching the impedance of said transmission line.

6. In an electronic pulse generating circuit, the combination comprising a generator of radio-frequency signals, a coaxial transmission line means for accumulating radio-frequency energy for periods of time longer than the time for one cycle to travel the length of said means and return having a center conductor coupled to the output of said generator, said line having a length equal to a quarter wavelength multiple of said signals from said generator, a normally open switch connected at a first end to said center conductor of said line, a mismatched terminating means provided across a second end of said line, and a load connectable through said switch to said center conductor, said load having a characteristic impedance matching the characteristic impedance of said line.

7. An electronic pulse generating circuit as described in claim 6, further characterized in that said generator has an output stage comprising an output amplifier, a parallel tuned circuit coupled in series with the output of said amplifier, and a coupling capacitor connected from the output of said amplifier to said center conductor of said transmission line.

8. An electronic pulse generating circuit as described in claim 6, further characterized in that the output of said signal generator is connected at a point along said center conductor located a multiple of a half wavelength of said signal from said first end.

9. An electronic pulse generating circuit as described in claim 6, wherein said line has a length in feet substantially equal to the duration of one of said pulses in microseconds times 450.

References Cited

UNITED STATES PATENTS

| | | | |
|---|---|---|---|
| 2,769,101 | 10/1956 | Drosd | 333—20 X |
| 2,951,973 | 9/1960 | Atkinson | 328—138 X |
| 3,201,612 | 8/1965 | Amodei | 307—88.5 |

ARTHUR GAUSS, *Primary Examiner.*

D. D. FORRER, *Assistant Examiner.*